United States Patent

[11] 3,592,559

| [72] | Inventor | John F. Ward<br>Newport News, Va. |
|---|---|---|
| [21] | Appl. No. | 853,746 |
| [22] | Filed | Aug. 28, 1969 |
| [45] | Patented | July 13, 1971 |
| [73] | Assignee | The United States of America as represented by the Administrator of the National Aeronautics and Space Administration |

[54] VARIABLE GEOMETRY ROTOR SYSTEM
10 Claims, 3 Drawing Figs.

[52] U.S. Cl. .................................................. 416/121,
416/115, 416/127, 416/130, 416/149, 416/200, 416/228

[51] Int. Cl. ........................................... B64c 27/10, B64c 27/80

[50] Field of Search ......................................... 416/115, 120, 121, 124, 127, 130, 133, 149, 150, 98, 99, 175, 200, 201, 203, 228

[56] References Cited
UNITED STATES PATENTS

| 1,467,537 | 9/1923 | Dornier | 416/121 |
|---|---|---|---|
| 1,771,654 | 7/1930 | Powell | 416/124 |
| 1,788,307 | 1/1931 | Lack | 416/121 |
| 2,126,221 | 8/1938 | Sessums | 416/124 (X) |
| 2,192,469 | 3/1940 | Green | 416/121 |
| 2,684,723 | 7/1954 | Faber | 416/228 |
| 2,982,361 | 5/1961 | Rosen | 416/44 |
| 3,153,454 | 10/1964 | Gaubis | 416/127 |
| 3,232,348 | 2/1966 | Jarosch | 416/105 |
| 3,369,610 | 2/1968 | Dancik | 416/143 |
| 3,482,552 | 12/1969 | Toyoda et al. | 416/124 (X) |

Primary Examiner—Everette A. Powell, Jr.
Attorneys—Howard J. Osborn and G. T. McCoy ABSTRACT: This rotor system is designed to control the nonuniform wake shed from a given rotor blade impinging upon the other blades of the rotor system. The rotor system utilizes blade sets which are of a different diameter than another blade set in the system. The azimuth spacing between the blade sets can be varied while the aircraft is in flight. The vertical spacing between the blade sets can also be changed. Mechanism is provided for collective pitch control of the blade sets. The plan form of blade sets, as well as the configuration of their tips, are varied.

INVENTOR.
JOHN F. WARD

VARIABLE GEOMETRY ROTOR SYSTEM

BACKGROUND OF THE INVENTION

It is well known that the helicopter, as well as other aircraft utilizing rotary blade configurations, are very noisy and subject to considerable vibration. In existing aircraft of this type, there exist excessive vibrations even if vibration control is normally handled by redistributing the blade mass and stiffness or by the addition of tip weights. In many instances, this is done by a trial and error basis. Furthermore, most prior art designs have fixed rotor configurations with blades of equal radius and equal azimuth spacing of the blades about the rotor hub. With this arrangement, when final rotor design has been decided on, it is difficult to make changes which will provide for optimum flight characteristics and also provide optimum noise and vibration characteristics. Other items such as the gross weight of the aircraft, center of gravity of the aircraft due to positioning of weight, age of components, (wear), all affect the noise and vibration characteristics of the rotor. The forward speed of the aircraft and rotor rotational speed also present design optimizing problems in the fixed spacing rotor blade design arrangement.

Actual prior art rotor designs exist with a wide variation in the number of blades, which may be anywhere from two to eight. Another prior art design is that of two identical rotors counterrotating on concentric shafts. A similar technique is that of two rotors counterrotating on canted shafts. Tandem rotors, which are two identical rotors rotating in opposite directions on two widely separated shafts, are also utilized. Segmented blade rotors, with inboard segments controlled in pitch independently from outboard segments are additional prior art arrangements. Rotors in which the rotor diameter is varied by retracting all blades from their maximum radius to a smaller radius simultaneously have been tested. However, in each of the above systems, the individual rotors operate with all blades of equal radius and equal azimuth spacing between the blades. Also, all blades of a given rotor operate in the same plane. With these arrangements, the tip vortices of the blades combine to form a complex set of interacting helix patterns in the rotor flow field. With these prior art devices, there is no direct control over the primary parameters which affect the rotor wake interactions that are generating the objectionable and limiting conditions of rotor impulsive loadings, vibration, blade-slap noise, and degradation in performance, much of which is the result of the wake shed from individual rotor blades impinging upon the other blades of the rotor system.

SUMMARY OF THE INVENTION

The ultimate objective of the invention is to achieve direct control over the wake vortex system generated by the rotor and its interactions with the rotor lifting surfaces, which changes with aircraft forward speed and maneuver conditions. The purpose of this control is to alter the noise, vibration, oscillatory loads, and performance characteristics of the rotor system. This has been accomplished in the invention here under consideration, by designing a rotor system which has various control features which can be applied directly to the noise, vibration and oscillatory load problems of the aircraft. These control features include such techniques as making the blade planform of one set of blades different from the blade planform of another set of blades. The idea of having one set of blades of a different radius than another set of blades is also utilized. The tip configuration of blade sets are changed. Many of the conditions which may change during flight of the aircraft due to varying speed, and weight are compensated for by varying the azimuth spacing of the blades or by varying the vertical spacing between the blade pairs. Mechanism is also provided for collectively changing the pitch of the blade sets independently or cyclically changing the pitch of a blade set independently to combat the various problems and to achieve overall vehicle control and trim.

DESCRIPTION OF THE PREFERRED EMBODIMENTS

Figure 1:
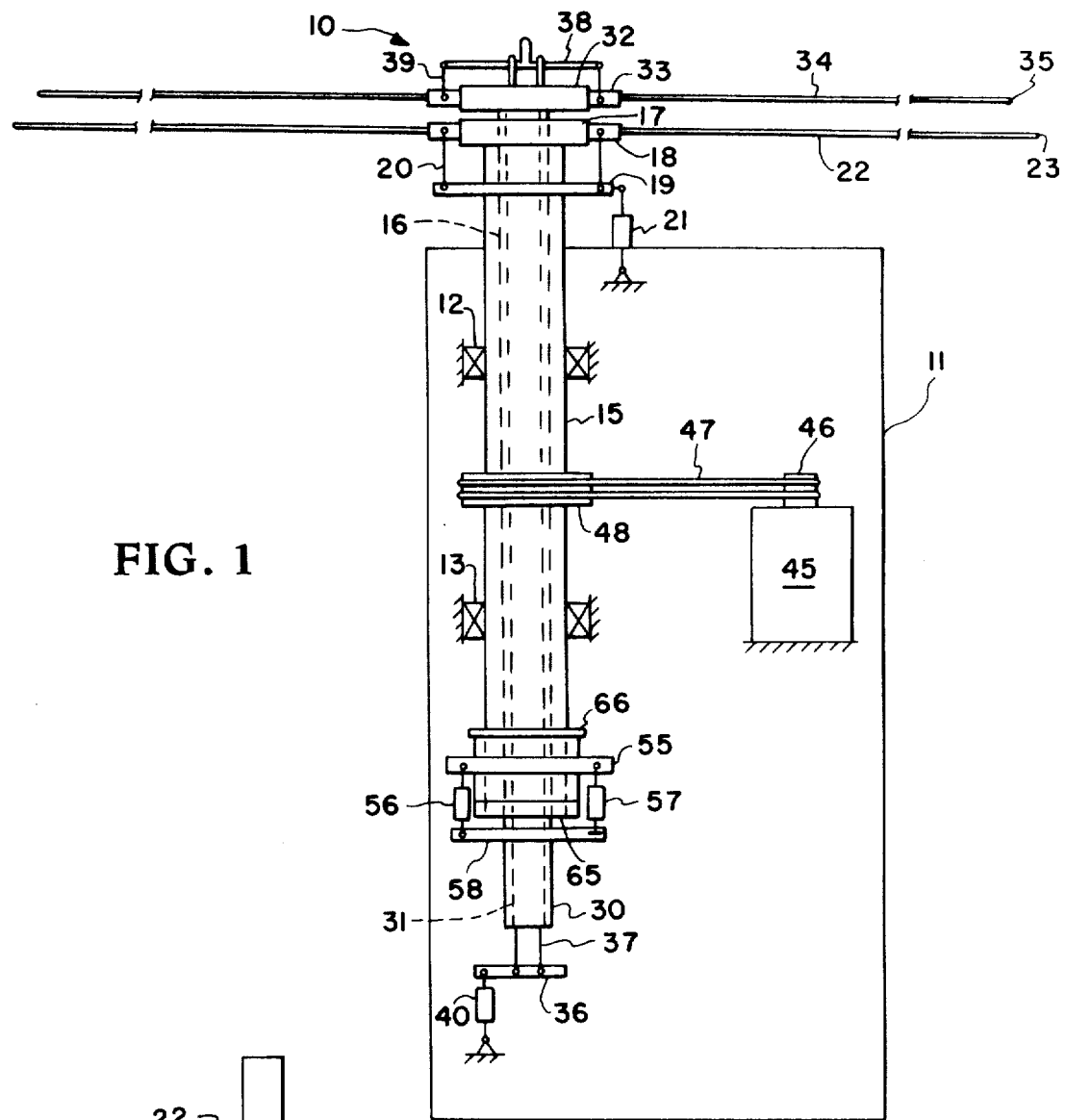
FIG. 1 is a side elevational view, partly in section, showing the mechanism which enables the in-flight variation of the rotor system.

Referring now more specifically to the details of the invention, the rotor system as shown in FIG. 1 is designated generally by the reference numeral 10.

The rotor system 10 would normally be associated with some type of aircraft, such as helicopter, but for purposes of simplicity, it is merely shown as associated with a support alignment system which is shown diagrammatically. Fixed to support 11 are upper and lower support bearings 12 and 13, respectively. These support bearings provide a journal for an outer drive shaft 15. The outer drive shaft is hollow having an opening 16 through which an inner drive shaft and other mechanism passes, to be explained more fully hereinafter. Fixed to the upper end of drive shaft 15 is a conventional helicopter blade hub mechanism 17 and feathering bearings 18. Located below this structure is additional conventional helicopter structure in the form of a swashplate 19. Linkage 20 connects the swashplate with the feathering bearings 18A swashplate actuator 21 is linked to the swashplate 20 for movement of the swashplate. The actuator 21 may be of the electric, pneumatic or mechanical type as the situation might require. Only one actuator 21 is shown on the drawings for purposes of clarity. However, it is to be understood that in actual practice, three actuators are utilized. One of the actuators moves the swashplate to provide for longitudinal control of the blades, another to provide lateral control of the blades, and the third for collective control of the blades.

Figure 2:
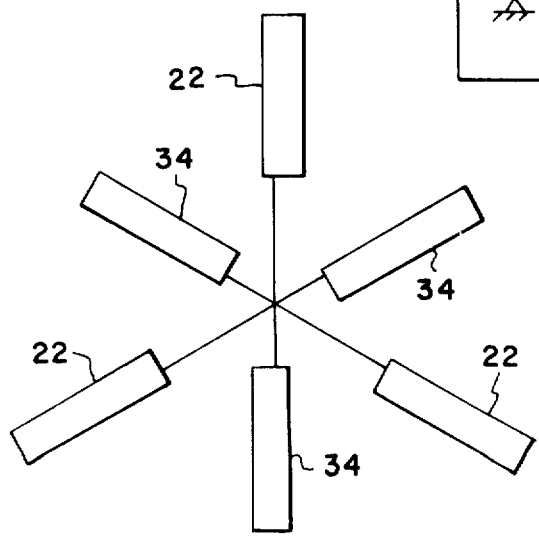
FIG. 2 is a plan view of a rotor system showing two blade sets wherein the radius of the blade sets differ.

The blade 22 is fixed to the feathering bearing 18, and extends therefrom in the usual manner. The blades may be attached via one or more hinges, directly cantilevered from the hub, or the blades may be continuous across the hub on a single teetering hinge. Two of the blades are shown in FIG. 1; however, there may be three or more blades extending from the hub 17 depending on the particular design of the blade structure. FIG. 2 shows an arrangement whereby three blades extend from one hub and another three from another hub. These two, three or four blades are thus considered a set of blades.

Figure 3:
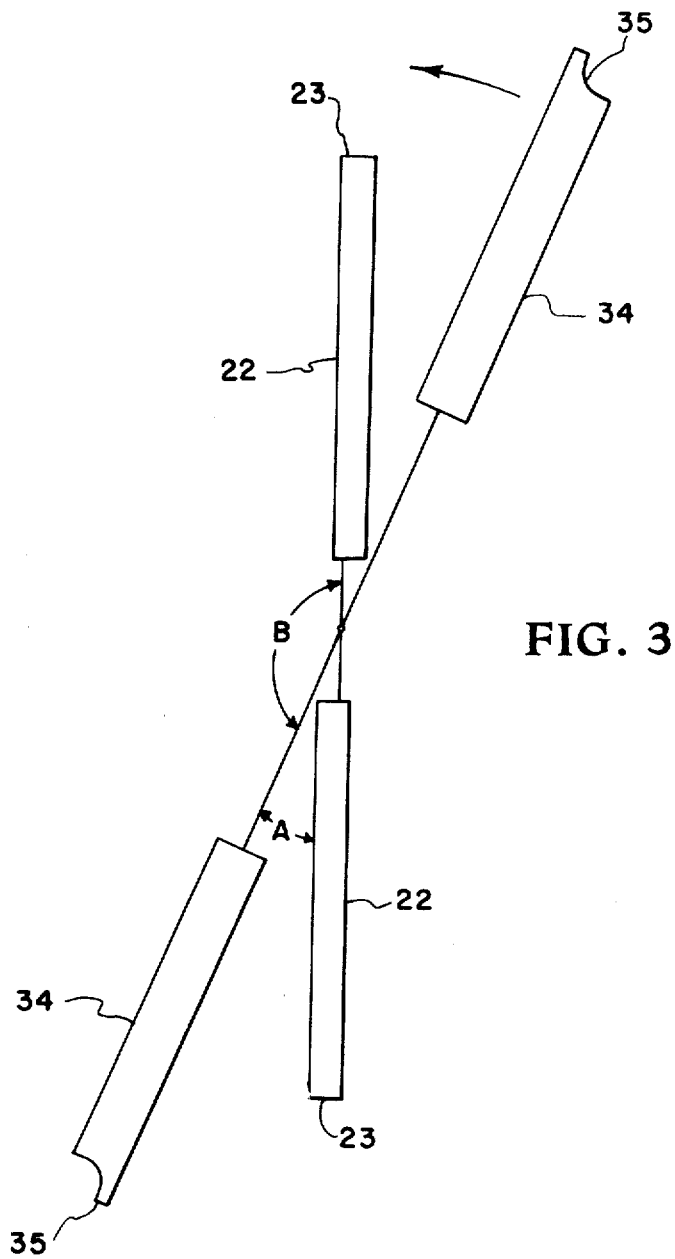
FIG. 3 is a plan view of a rotor system showing two blade sets wherein the azimuth spacing between the blade sets is unequal, and the planform and blade tips of the sets are of a different configuration.

The blade tip 23 may be of a special configuration, this configuration changing from blade set to blade set as shown in FIG. 3.

An inner drive shaft 30 is positioned within the opening 16 of the outer drive shaft 15 and is concentric therewith. Although not shown, bearings may be provided between the inner and outer shafts to enable smooth relative rotation and to maintain concentricity. The inner drive shaft 30 is also hollow having an inner passage 31. This passage enables certain of the operating mechanism to pass through the inner shaft in a manner to be explained more fully hereinafter.

Fixed to the upper end of the inner drive shaft is a hub 32. The hub 32 is similar in design to the hub 17 and is of a conventional nature. Feathering bearings 33 are connected to the hub 32 and support blades 34 and their tip configuration 35 connected to the feathering bearings. Again, as with blades 22, there may be two, three or four or more blades depending on design requirement. These blades constitute a set of blades. The blade tip configuration 35 may also vary as required in a particular design.

Located below the inner drive shaft 30 is a swashplate 36. The swashplate 36 is associated with control rods 37 which pass through the passage 31 in the inner shaft and extend above the hub 32. These control rods are connected to another swashplate 38 which is located above the hub 32. Linkage 39 connects swashplate 36 and is utilized to control movement of the blades 34. The actuator 40 may be of the electric, pneumatic or mechanical type as the situation demands. Again, for purposes of clarity only one actuator 40 is shown; however, in actual practice there are three actuators 40. As explained previously, these actuators provide longitudinal, lateral and collective control of the blades, and in this instance the blades 34.

The drive motor 45 which in a helicopter would be the engine which powers the aircraft, has a pulley arrangement 46 and drive belt system 47 which is entrained over a sheave arrangement 48 connected to the outer drive shaft 15. In a helicopter, 45, 46, 47, and 48 would be the conventional engine, gearbox and shafting. The motor 45, of course, provides power for rotating the mechanism and blades 22 and 34 to enable flight of the aircraft.

In order to provide in-flight variation in vertical spacing between the blades 22 and 34, a vertical actuator 56 is connected between a reaction plate 55 which is fixed to the support 11 and a plate 58 which is connected to the inner drive shaft 30. The vertical actuator 56 may be of a conventional design, wherein an electrical motor with appropriate gearing may be utilized to move the plate 58 vertically relative to 55. Since the plate 58 is connected to the inner drive shaft 30, the blades 22 and 24 will be spaced vertically be movement of the inner shaft.

The invention also provides for varying the azimuth spacing between the blades 22 and 34, this being accomplished by the actuator 57. The actuator 57 is also carried by the reaction plate 55 and has a geared connection with the plate 58. Operation of the actuator 57 will result in rotation of the plate 58 which is fixed to the inner shaft 30. Such a rotation will result in changing the azimuth spacing between the blades 22 and 34.

A clutch 65, shown diagrammatically, is provided between the end of the outer drive shaft 15 and the inner drive shaft 30. This clutch may be of the positive type which has inner engaging teeth, this clutch being of a conventional design. A clutch actuator 66, also of a conventional design, may be utilized to separate the teeth to enable the actuator 57 to rotate the shaft 30 with respect to the shaft 15. The teeth of the clutch 65 are of sufficient length such that they remain engaged when the actuator 56 is utilized to vary the vertical spacing between the blades 22 and 34.

The plan view of FIG. 2 better illustrates the differing radii of the blade 22 and 34. It is readily apparent that the blades 22 have a greater radius or diameter than the blades 34. FIG. 1 best illustrates the vertical spacing between the blades 22 and 34.

The plan view of FIG. 3 also illustrates the differing radii of the blades 22 and 34. Also illustrated is the different azimuth spacing which can be accomplished in flight between the blades. It is believed clear that angle A is much smaller than the angle B. These angles can be varied in flight to obtain the desired spacing which will provide the greatest effect. It should also be noted that the blades 22 and 34 can be moved to a position of vertical alignment wherein angle A equals 0 (zero). This is a desirable feature in the four-blade arrangement such as shown in FIG. 3, particularly when it is desired to store the helicopter or other bladed aircraft since the blades can be made to lie in a plane common with the longitudinal axis of the aircraft. Although FIG. 2 shows equal azimuth spacing, it is to be understood that the azimuth angle between the blade sets as shown in FIG. 2 can also be varied.

FIG. 3 also illustrates that the plan form of the blades 22 and 34 may be of a different design. The chord of the blade 34 is greater than that of blade 22. The shape of blade might also be changed by making the blade shorter or longer or varying the chord along the radius dimension. Under certain circumstances, it might also be desirable to vary the cross-sectional configuration of the blades.

It can be seen in FIG. 3, that the blade tip configuration differs from blades 22 and 34. The tip 23 of blade 22 is of a conventional square design whereas the tip 35 of blade 34 is a scalloped design, of such a shape to diminish the intensity of the tip vortex trailed from blade 34. The direction of rotation of the scalloped blade would be in the direction of the arrow, the scallop being along the trailing edge of the blade.

From the above description of the invention, it can be seen that the control arrangements provide a real advantage over the prior art. Tests utilizing smoke, and being observed by movies and stop-action photographs indicate that vertical and azimuthal spacing of the blade sets, the use of varying blade radii and configurations have a strong influence on the vortex interactions in the rotor wake flow. The measured thrust and torque data indicated that the aerodynamic interference between blades had been altered accomplishing the objective of variable geometry rotor system concept. The results are the capability of obtaining lower noise with less vibration for all modes of rotor aircraft operation.

What I claim as new and desired to be secured by Letters Patent of the United States is:

1. A variable geometry rotor assembly for aircraft comprising:

blade means for a helicopter or similar vehicle having lift-producing blades;
   said blade means being arranged in sets;
   one set of said blade means having a greater diameter than another set; and
   means for varying the angular relationship between said sets to control the wake vortex interaction effect from the blade means.

2. A variable geometry rotor assembly for aircraft as in claim 1 wherein the tips of one blade set have a different configuration than the tips of another blade set.

3. A variable geometry rotor assembly for aircraft as in claim 1 including means for varying the vertical distance between said blade sets.

4. A variable geometry rotor assembly for aircraft as in claim 1 wherein one set of blades is carried by a drive shaft; and said other set of blades being carried by another drive shaft concentric with said first mentioned drive shaft.

5. A variable geometry rotor assembly for aircraft as in claim 4 wherein said shafts are clutched together, nd means for releasing said clutch to enable said shafts and sets to move relative to each other while said aircraft is in flight.

6. A variable geometry rotor assembly for aircraft as in claim 1 wherein the blade planform of one set differs from the blade planform of another set.

7. A variable geometry rotor assembly for aircraft as in claim 1 wherein means is included to change the pitch of said blade sets collectively.

8. A variable geometry rotor assembly for aircraft as in claim 1 wherein means is included to change the pitch of a blade set cyclically.

9. A variable geometry rotor assembly for aircraft as in claim 1 wherein means is included to vary the vertical distance between blade sets; means for collectively changing the pitch of the blade sets; and means for cyclically changing the pitch of a blade set.

10. A variable geometry rotor assembly as in claim 1 wherein the wing planform of said blade sets differ; said blade sets' tips having different configurations; means for varying the vertical spacing between said blade sets; means for collectively changing the pitch of the blade sets, and means for cyclically changing the pitch of a blade set.